(No Model.)  2 Sheets—Sheet 1.

J. M. KEEN.
Churn.

No. 228,646. Patented June 8, 1880.

Witnesses.
Fred. G. Dieterich
Albert H. Krause

Inventor
James M. Keen
by
Louis Bagger & Co.
Attorneys (No Model.) 2 Sheets—Sheet 2.
J. M. KEEN.
Churn.
No. 228,646. Patented June 8, 1880.
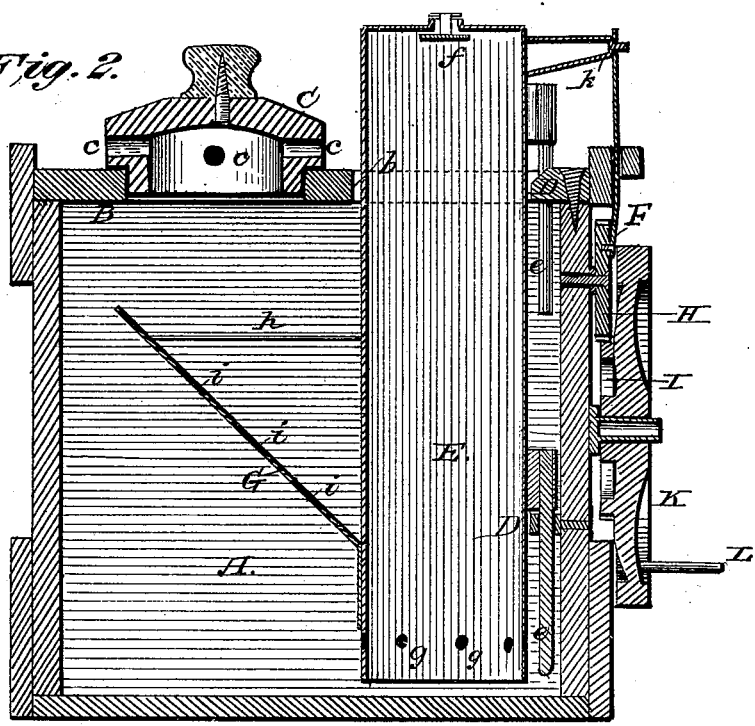
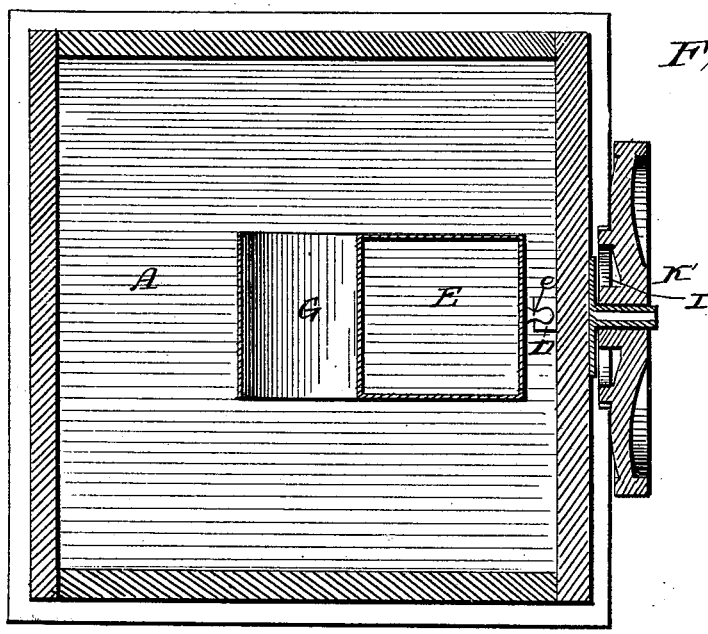
Witnesses
Fred. G. Dieterich
Albert F. Krause.
Inventor:
James Moral Keen
by Louis Bagger & Co.
Attorneys
N. PETERS, PHOTO-LITHOGRAPHER, WASHINGTON, D. C.

UNITED STATES PATENT OFFICE.

JAMES M. KEEN, OF DIGBY, NOVA SCOTIA, CANADA.

CHURN.

SPECIFICATION forming part of Letters Patent No. 228,646, dated June 8, 1880.

Application filed March 24, 1880. (No model.)

*To all whom it may concern:*

Be it known that I, JAMES MORAL KEEN, of Digby, in the Province of Nova Scotia and Dominion of Canada, have invented certain new and useful Improvements in Churns; and I do hereby declare that the following is a full, clear, and exact description of the invention, which will enable others skilled in the art to which it appertains to make and use the same, reference being had to the accompanying drawings, which form a part of this specification, and in which—

Figure 1:
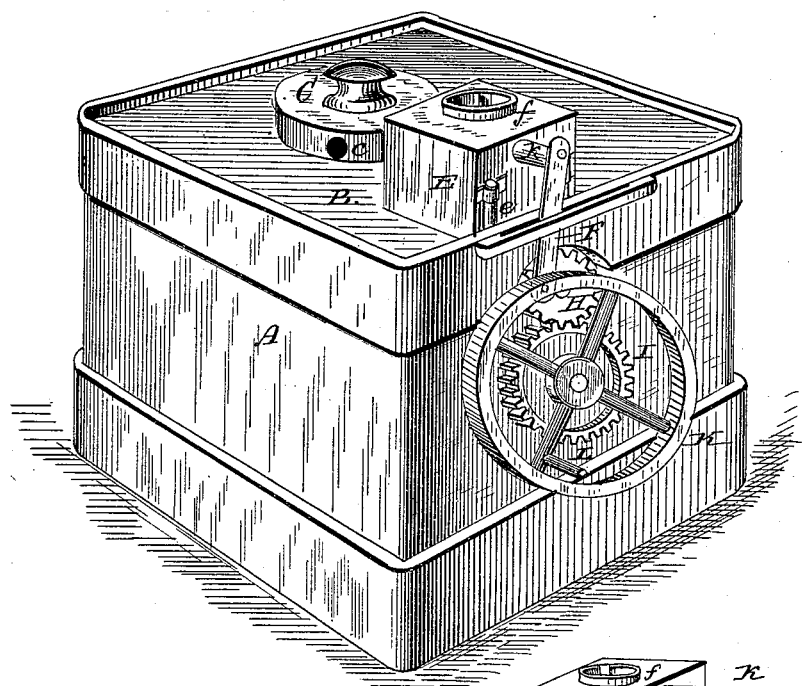
Figure 4:
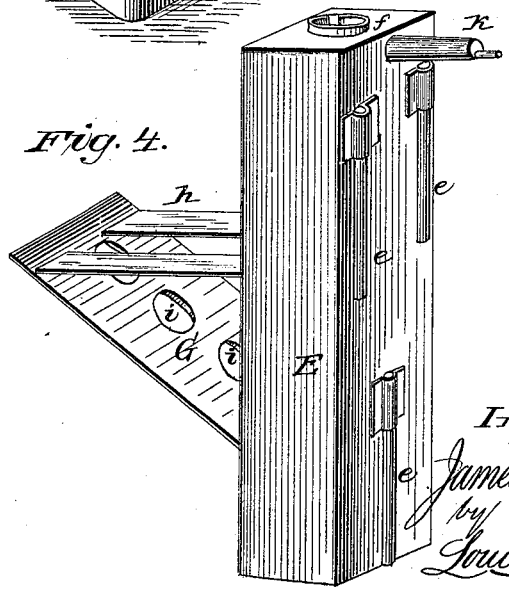

Figure 1 is a perspective view of my improved aerating-churn. Fig. 2 is a vertical section. Fig. 3 is a horizontal section; and Fig. 4 is a perspective view of the air-pump and dasher detached from the churn-body.

My invention relates to aerating-churns; and it consists in the combination, with a stationary churn-body or cream-receptacle, of a vertically-reciprocating air-pump and dasher for simultaneously aerating and stirring or agitating the cream, substantially as hereinafter more fully set forth.

In the drawings, A is the churn-body, which may be square, cylindrical, or of any other desired shape, and has a detachable cover, B, having a circular aperture, which is closed by a plug or stopper, C, that is provided with a series of lateral air-holes, *c c*.

Projecting inwardly from one of the sides or walls of the churn are two brackets, (denoted by D D,) which are perforated for the insertion of the guide-bars *e e e* of the air pump or plunger E. This consists of a cylindrical or square box, made by preference of sheet metal, open at the bottom but closed on top, where it has an automatically-operating air-valve, *f*. A short distance above its open bottom is a series of holes, *g g*, and secured upon and projecting from its front side or face, at an angle of about forty-five degrees, is the dasher or stirrer G, which is held rigidly in place by connecting strips or braces *h h*, and is provided with holes *i i*, to permit the passage through it of the cream.

A vertical reciprocating motion is imparted to the plunger E, with its dasher, by a pitman, F, the upper end of which is pivoted in the projecting arm *k*, while its lower end is pivoted in a wrist-pin of the pinion H, that meshes with a gear-wheel, I, secured concentrically upon the fly-wheel K, which has a crank or arm, L, for operating it. The cover B is recessed at *b* to admit of the insertion and operation of the plunger.

In operating the churn air enters the plunger on the upstroke through its valve *f*, which is closed on the downstroke, thus forcing the air contained in the hollow plunger out into the cream through the apertures *g g*. At the same time the inclined dasher G will throw the cream on every downstroke violently against the opposite side of the churn, as well as working it up and down, the air, which at each stroke of the plunger is forced into the cream, escaping through the vent-holes in the circular plug C, which are so arranged that only the air, but not the cream, can escape by splashing.

If desired, the dasher-blade G may be omitted, or one or more dashers of a different construction may be used; but by preference I use a dasher, as herein shown, as it facilitates and expedites the formation of the butter.

Having thus described my invention, I claim and desire to secure by Letters Patent of the United States—

1. The combination, with the churn-body A, having perforated brackets D D and recessed cover B, of the vertically-reciprocating hollow plunger E, provided with the guide-bars *e*, valve *f*, and air-holes *g*, substantially as and for the purpose herein shown and set forth.

2. In combination, the churn-body A, provided with the intermeshing drive or gear wheels I H and pitman F, hollow plunger E, provided with the laterally-projecting arm *k*, valve *f*, guide-bars *e e e*, air-holes *g*, and dasher G and cover B, recessed at *b* and provided with the plug or cap C, having lateral apertures or vent-holes *c c*, substantially as and for the purpose herein shown and specified.

In testimony that I claim the foregoing as my own I have hereto affixed my signature in presence of two witnesses.

JAMES MORAL KEEN.

Witnesses:
 JOHN KINNEY,
 JOHN LESLIE STEWART DAKIN.